(12) United States Patent
Wakabayashi

(10) Patent No.: US 6,965,446 B2
(45) Date of Patent: Nov. 15, 2005

(54) INTERNET FACSIMILE APPARATUS AND INTERNET FACSIMILE COMMUNICATION METHOD

(75) Inventor: Takefumi Wakabayashi, Tokorozawa (JP)

(73) Assignee: Panasonic Communications Co., Ltd., Tokyo (JP)

( * ) Notice: Subject to any disclaimer, the term of this patent is extended or adjusted under 35 U.S.C. 154(b) by 982 days.

(21) Appl. No.: 09/775,568

(22) Filed: Feb. 5, 2001

(65) Prior Publication Data

US 2002/0051221 A1 May 2, 2002

(30) Foreign Application Priority Data

Jun. 22, 2000 (JP) ........................................ 2000-188367

(51) Int. Cl.[7] .......................... G06F 15/00; H04N 1/00; H04M 11/00
(52) U.S. Cl. ...................... 358/1.15; 358/407; 358/402; 379/100.01; 379/100.08
(58) Field of Search ............................... 358/1.15, 1.9, 358/407, 426.05, 402, 1.1, 1.16, 442, 404, 426.02, 444, 468, 405, 474, 476, 440; 379/93.01, 100.01, 100.08, 90.01, 93.07, 93.15, 93.31, 100.06, 100.12, 100.09; 347/49, 50, 19

(56) References Cited

U.S. PATENT DOCUMENTS

| | | | |
|---|---|---|---|
| 5,585,941 A | | 12/1996 | Maemura |
| 5,881,233 A | | 3/1999 | Toyoda et al. |
| 6,005,677 A | | 12/1999 | Suzuki |
| 6,389,121 B1 | * | 5/2002 | Terao .................... 379/100.08 |
| 6,545,768 B1 | | 4/2003 | Matsubara et al. |
| 6,618,749 B1 | * | 9/2003 | Saito et al. ................. 709/207 |
| 6,700,674 B1 | * | 3/2004 | Otsuka et al. ............. 358/1.15 |

FOREIGN PATENT DOCUMENTS

| | | |
|---|---|---|
| JP | 4-90254 | 3/1992 |
| JP | 8-242326 | 9/1996 |

(Continued)

OTHER PUBLICATIONS

English Language Abstract of JP 11-41379.

(Continued)

*Primary Examiner*—Kimberly Williams
*Assistant Examiner*—Thomas J. Lett
(74) *Attorney, Agent, or Firm*—Greenblum & Bernstein, P.L.C.

(57) ABSTRACT

When an IFAX processing section transmits image information using e-mail, a timer monitoring section starts the count of a timer. After starting the count, a received mail determining section determines whether or not a timeout occurs. Also, the received mail determining section determined whether an error mail of a current job or a DSN of the current job is received. In the case of the timeout, when the notification content of the error mail or the DSN is an abnormal end, a transmission selecting section instructs a FAX control section to transmit an image information file of the current job to a telephone number. Thereafter, the transmission selecting section instructs an image information managing section to erase an image information file corresponding to a file name of the current job. This makes it possible to insure a real-time property as making use of advantages of e-mail.

4 Claims, 14 Drawing Sheets

FOREIGN PATENT DOCUMENTS

| | | |
|---|---|---|
| JP | 9-200250 | 7/1997 |
| JP | 10308766 | 11/1998 |
| JP | 11-32194 | 2/1999 |
| JP | 11-41379 | 2/1999 |
| JP | 11-69071 | 3/1999 |
| JP | 11112778 | 4/1999 |
| JP | 11-112778 | 4/1999 |
| JP | 11205574 | 7/1999 |
| JP | 11220599 | 8/1999 |
| JP | 11-69071 | 9/1999 |
| JP | 11252164 | 9/1999 |
| JP | 11317763 | 11/1999 |
| JP | 11-331473 | 11/1999 |
| JP | 11331473 | 11/1999 |
| JP | 2000-22922 | 1/2000 |
| WO | 97/10668 | 3/1997 |

OTHER PUBLICATIONS

English Language Abstract of JP 11–32194.
English Language Abstract of JP 11–205574.
English Language Abstract of JP 11–220599.
English Language Abstract of JP 11–112778.
English Language Abstract of JP 2000–22922.
English Language Abstract of JP 10–308766.
English Language Abstract of JP 11–69071.
English Language Abstract of JP 11–317763.
English Language Abstract of JP 9–200250.
English Language Abstract of JP 11–331473.
English Language Abstract of JP 11–252164.
English Language Abstract of JP 4–90254.

* cited by examiner

ONE-TOUCH/ABBREVIATED
NUMBER REGISTRATION TABLE 701

| No. | DESTINATION MAIL ADDRESS 702 | TELEPHONE NUMBER 703 | FAX TRANSMISSION FLAG 704 | TIMER INITIAL VALUE(MIN.) 705 | DELIVERY CONFIRMATION FLAG 706 |
|---|---|---|---|---|---|
| 001 | Test@mgcs.co.jp | 54347073 | EXECUTE | 10 | EXISTENCE |
| 002 | Test2@mgcs.co.jp | (NON-REGISTRATION IS EXECUTED WHEN NO G3 TRANSMISSION IS PERFORMED) | NON-EXECUTE | 5 | ABSENCE |
| 999 | Test99@mgcs.com | 00112345678 | EXECUTE | 60 | EXISTENCE |

FIG.7

TRANSMISSION JOB TABLE

| MANAGE NUMBER 801 | DESTINATION MAIL ADDRESS 802 | TELEPHONE NUMBER 803 | TIMER VALUE(MIN.) 804 | TRANSMISSION MAIL MESSAGE ID 805 | STATUS 806 | FILE NAME 807 |
|---|---|---|---|---|---|---|
| 001 | Test@mgcs.co.jp | 54347073 | 10 | 199911300606.A002@mgcs.co.jp | WAIT FOR DELIVERY CONFIRMATION | 0123 |
| 002 | Test2@mgcs.co.jp | | 5 | 199911300607.B002@mgcs.co.jp | WAIT FOR TIMEOUT | 0124 |

FIG.8

```
Received: by bulls.mei.co.jp (8.9.3/3.7W) with internal id QAA04949;
         Tue, 8 Feb 2000 16:18:49 +0900 (JST)
Date: Tue, 8 Feb 2000 16:18:49 +0900 (JST)
From: Mail Delivery Subsystem <MAILER-DAEMON@bulls.mei.co.jp>
Subject: Returned mail: Host unknown (Name server: mgcs.mei.jp.: host not found)
Message-Id: <200002080718.QAA04949@bulls.mei.co.jp>
To: <wakaba@rdmg.mgcs.mei.co.jp>
MIME-Version: 1.0
Auto-Submitted: auto-generated (failure)
Content-Type: multipart/report; report-type=delivery-status;
         boundary="QAA04949.949994329/bulls.mei.co.jp"

The original message was received at Tue, 8 Feb 2000 16:18:45 +0900 (JST)
from dodgers.mei.co.jp [157.8.1.150]

----- The following addresses had permanent fatal errors -----
<wa1111@mgcs.mei.jp>

----- Transcript of session follows -----
550 <wa1111@mgcs.mei.jp>... Host unknown (Name server: mgcs.mei.jp.: host not
found)
```

Content-Type: message/delivery-status

Reporting-MTA: dns; bulls.mei.co.jp
Received-From-MTA: DNS; dodgers.mei.co.jp
Arrival-Date: Tue, 8 Feb 2000 16:18:45 +0900 (JST)

Final-Recipient: RFC822; wa1111@mgcs.mei.jp
Action: failed
Status: 5.1.2
Remote-MTA: DNS; mgcs.mei.jp
Last-Attempt-Date: Tue, 8 Feb 2000 16:18:48 +0900 (JST)

```
Received: from nwpc08.mei.jp
         by server.mei.jp (8.9.3/3.7W-RDMG) with SMTP id QAA03777
         for <wakaba@mei.jp>; Tue, 8 Feb 2000 16:15:29 +0900 (JST)
Message-Id: 200002080716.AA04530@ifax.co.jp    ←--Message ID
From: Wakabayashi <wakaba@mei.jp>
Date: Tue, 08 Feb 2000 16:16:05 +0900
To: wakaba@mei.jp
MIME-Version: 1.0
X-Mailer: InternetFAX
Content-Type: text/plain; charset=iso-2022-jp Thank you for your assistance.
```

FIG. 11

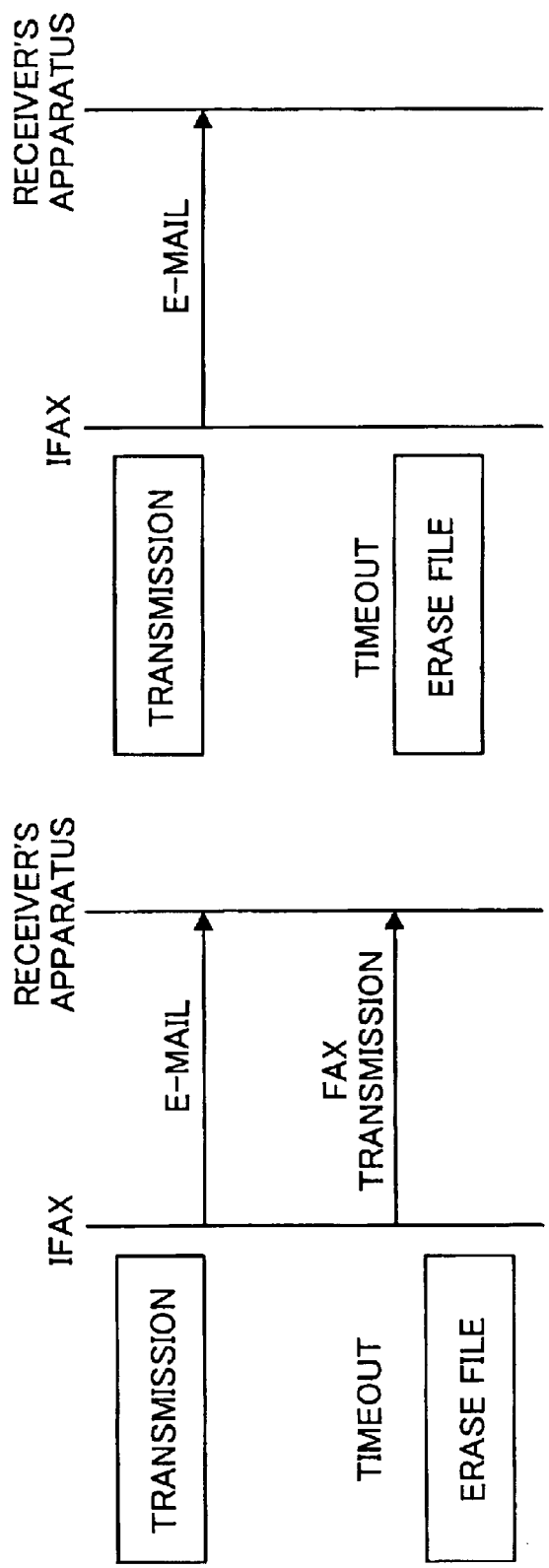

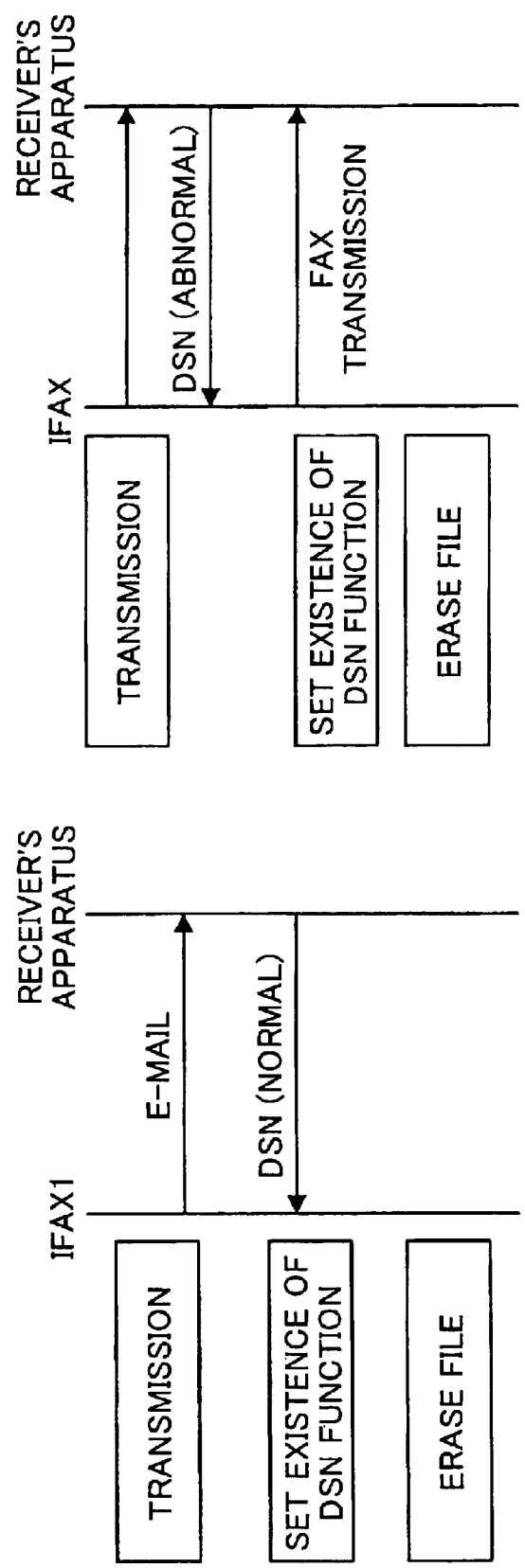

CASE OF NO FAX TRANSMISSION

CASE OF FAX TRANSMISSION

IN CASE OF ERROR

INTERNET FACSIMILE APPARATUS AND INTERNET FACSIMILE COMMUNICATION METHOD

BACKGROUND OF THE INVENTION

1. Field of the Invention

The present invention relates to an Internet facsimile apparatus and an Internet facsimile communication method.

2. Description of the Related Art

In recent years, an E-mail Internet facsimile apparatus (hereinafter referred to as IFAX), which performs data transmission/reception over Internet using e-mail, has been in practical use as disclosed in, for example, Unexamined Japanese Patent Publication No. 8-242326 and the corresponding U.S. Pat. No. 5,881,233.

In a general IFAX communication system, an e-mail message transmitted from an IFAX at a sender side is sent to a mail server on a receiver side via a mail server on the sender side. In the case of POP3, the e-mail message is stored to the mail server, and a receiver terminal inquires of the mail server whether or not the e-mail message is arrived at the mail server at a fixed time interval to receive the e-mail message from the mail server. In the case of SMTP, when the mail server receives the e-mail message from the mail server, the mail server directly distributes the received e-mail message to a receiver terminal. Unlike the case of POP3, the receiver terminal does not have to inquire of the mail server.

The IFAX communication system has advantages in which (A) image information is transmitted using the Internet, making it possible to largely reduce a communication cost as compared with a normal G3/G4 facsimile communication system, and (B) the use of e-mail transfer protocol (SMTP, POP3, and so on) makes it possible to perform communication, which passes through an Internet firewall.

However, in the e-mail system including the IFAX communication system, a plurality of mail servers distributes by turns the e-mail message from the sender to a final distribution destination as relaying. Therefore, distribution time depends on mail server processing time, operation state, and the like. For example, when an abnormal overload is applied to a certain mail server at a relay point, it takes several hours before the message is distributed to a next relay point in some cases. Moreover, when the power supply of the mail server temporarily drops, re-transmission to the mail server is repeated, causing the e-mail distribution to be delayed by an amount of time, which is required before the power supply starts up, in some instances. Thus, in the IFAX communication system, since there is a possibility that delay in the delivery of e-mail message will occur, a real-time property is not insured.

Furthermore, in the IFAX communication system, it is proposed that IFAX on a receiver side notifies a sender of an e-mail message (delivery status notification mail; DSN, proposed in RFC of IETF) for informing the sender of a delivery status of transmitted e-mail message. Moreover, in the normal e-mail system, when a destination mail address is incorrect or a mail server on a receiver side goes down, such an operation that a mail server on a sender side transmits an error mail to the sender is carried out. When IFAX on the sender side receives the delivery status notification mail from the destination or the error mail from the mail server, hereinafter referred to as "delivery confirmation mail", the mail is printed and the content is notified to the sender.

In this way, failure in transmission can be recognized. However, even if the delivery confirmation mail is used, image information does not reach a communication partner unless the sender performs re-transmission. In view of this point, the real-time property is not insured in the IFAX communication system.

In a G3/G4 facsimile communication system, since communication is carried out as performing negotiations with each other, the real-time property is insured. Even in the IFAX communication system, it is strongly desirable that the real-time property be insured as making use of the advantages of e-mail.

SUMMARY OF THE INVENTION

The present invention has been made with consideration given to the above-mentioned problem into account, and an object of the present invention is to provide an Internet facsimile apparatus, which is capable of insuring a real-time property as making use of advantages of e-mail, and an Internet facsimile communication method.

According to the present invention, in order to attain the above object, mail transmitter transmits image information to a receiver, thereafter if the receiver does not normally receive the corresponding image information within a predetermined time period, facsimile transmitter retransmits the image information to the same person as the receiver.

Thus, the image information is retransmitted to the receiver when the receiver does not normally receive the corresponding image information within the predetermined time period, and this makes it possible to suppress delay in transmission of the image information using e-mail within a predetermined time period.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 7 is a view showing one example of a one-touch/abbreviated number registration table of the Internet facsimile apparatus according to the above embodiment;

FIG. 8 is a view showing one example of a transmission job table of the Internet facsimile apparatus according to the above embodiment;

FIG. 11 is a view showing one example of an error mail received by the Internet facsimile apparatus according to the above embodiment;

FIG. 12A is a sequence view showing an image information transmission performed by the Internet facsimile apparatus according to the above embodiment;

FIG. 12B is a sequence view showing an image information transmission performed by the Internet facsimile apparatus according to the above embodiment;

FIG. 13A is a sequence view showing an image information transmission performed by the Internet facsimile apparatus according to the above embodiment respectively;

FIG. 13B is a sequence view showing an image information transmission performed by the Internet facsimile apparatus according to the above embodiment;

DETAILED DESCRIPTION OF THE PREFERRED EMBODIMENTS

Preferred embodiments of the present invention will be specifically described with reference to the accompanying drawings.

Figure 1:
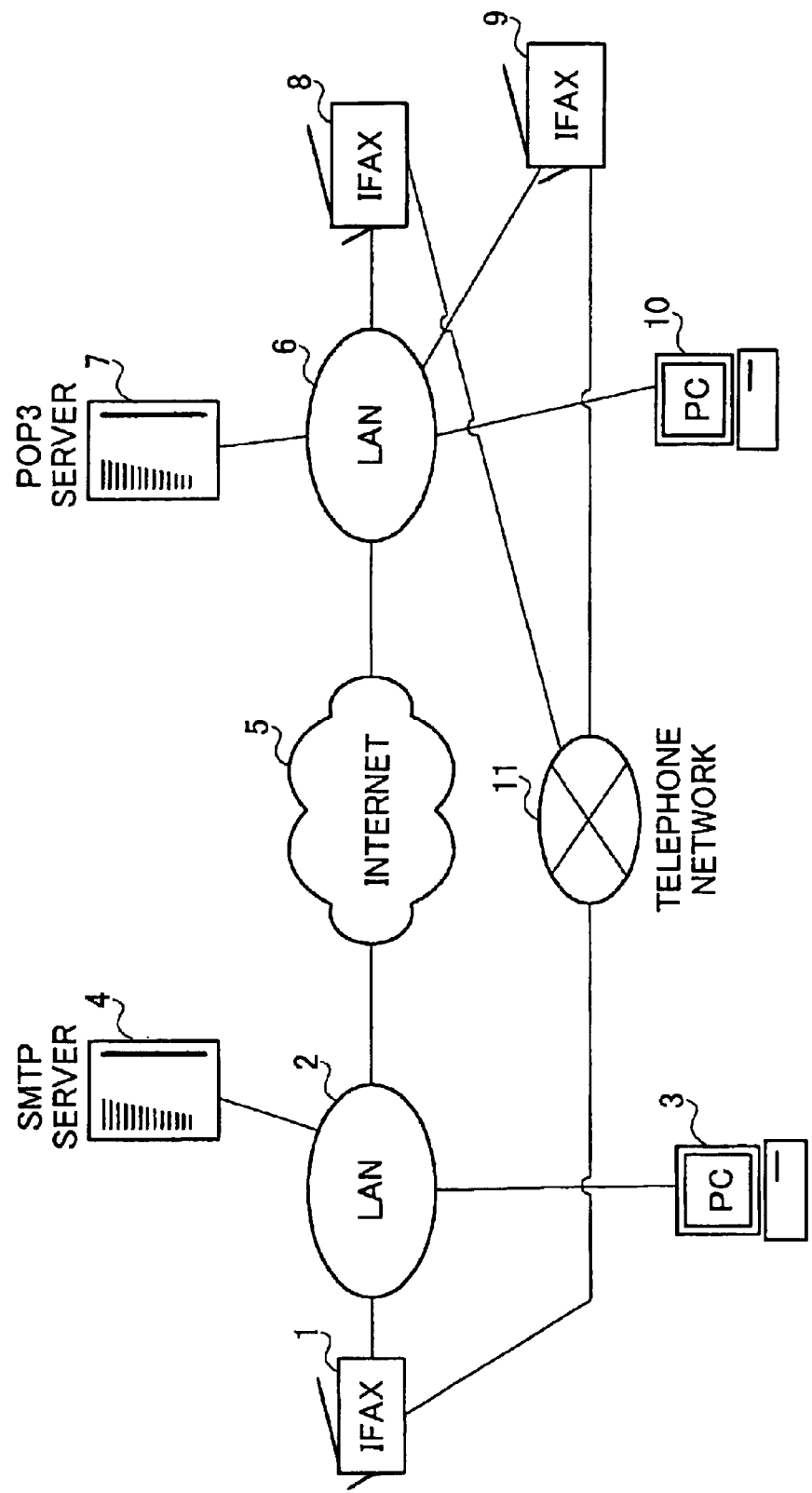
FIG. 1 is a conceptual view showing a network where an Internet facsimile apparatus according to an embodiment of the present invention operates.

FIG. 1 is a conceptual view showing a network where an Internet facsimile apparatus according to an embodiment of the present invention operates.

An IFAX according to the above first embodiment is connected to a local area network (LAN) 2. In addition, a personal computer 3 is connected to the LAN 2. Moreover, an SMTP server 4 is connected to the LAN 2. The SMTP server 4 transfers an e-mail message from a client such as the IFAX 1, PC3 and the like to a POP (Post Office Protocol) 3 server 7, which is provided in a receiver side, in accordance with an SMTP (Simple Mail Transfer Protocol), which is one of mail transfer protocols between the client and the server and between the servers.

The LAN 2 is connected to the Internet 5, and other LAN 6, receiver side's network, is connected to the Internet 5. The POP3 server 7, an IFAXes 8, 9, and a PC 10 are connected to the LAN 6. The POP3 server 7 is received e-mail from the SMTP server 4 in accordance with the SMTP to store e-mail to a mailbox of each mail account such as IFAXes 8, 9, PC 10. Then, the POP3 server 7 distributes e-mail to the mail account in accordance with the POP3. The POP3 is one of the protocols, which is used to distributes the mail to the mail account from the server, and APOP, IMAP4, and the like can be named other than the POP3.

Furthermore, the IFAXes 8 and 9 can directly transmit the e-mail to the SMTP server on the communication partner (the SMTP server 4 shown in FIG. 1 or an SMTP server (not shown) provided in the LAN 6) using the SMTP. In this case, the SMTP server directly distributes a received e-mail message to the IFAXes 8 and 9.

This configuration allows the IFAX 1 to transmit image information to the IFAXes 8, 9 and PC 10 using e-mail via the Internet 5.

Here, though the IFAXes 1, 8, and 9 are connected to the Internet 5 via the LAN 2, they are not particularly limited to such a connection. For example, a dial-up connection may be carried out via an Internet Service Provider.

The IFAX 1 is connected to a telephone network to transmit image information to the IFAXes 8 and 9 through a standard facsimile procedure. This telephone network includes, for example, a Public Switched Telephone Network (PSTN), an Integrated Services Digital Network (ISDN), a wireless telephone network, and so on.

In this network system, though the computer network where the e-mail is transmitted and received is constructed by the LANs 2, 6 and the Internet 5, the construction of the computer network is not limited to the above, and wireless LAN, WAN, VAN, and the like are widely included. From a different point of view, any computer network may be used if the network can implement transmission/reception of image information in accordance with an e-mail transfer protocol to be described later, for example, a TCP/IP network.

Figure 2:
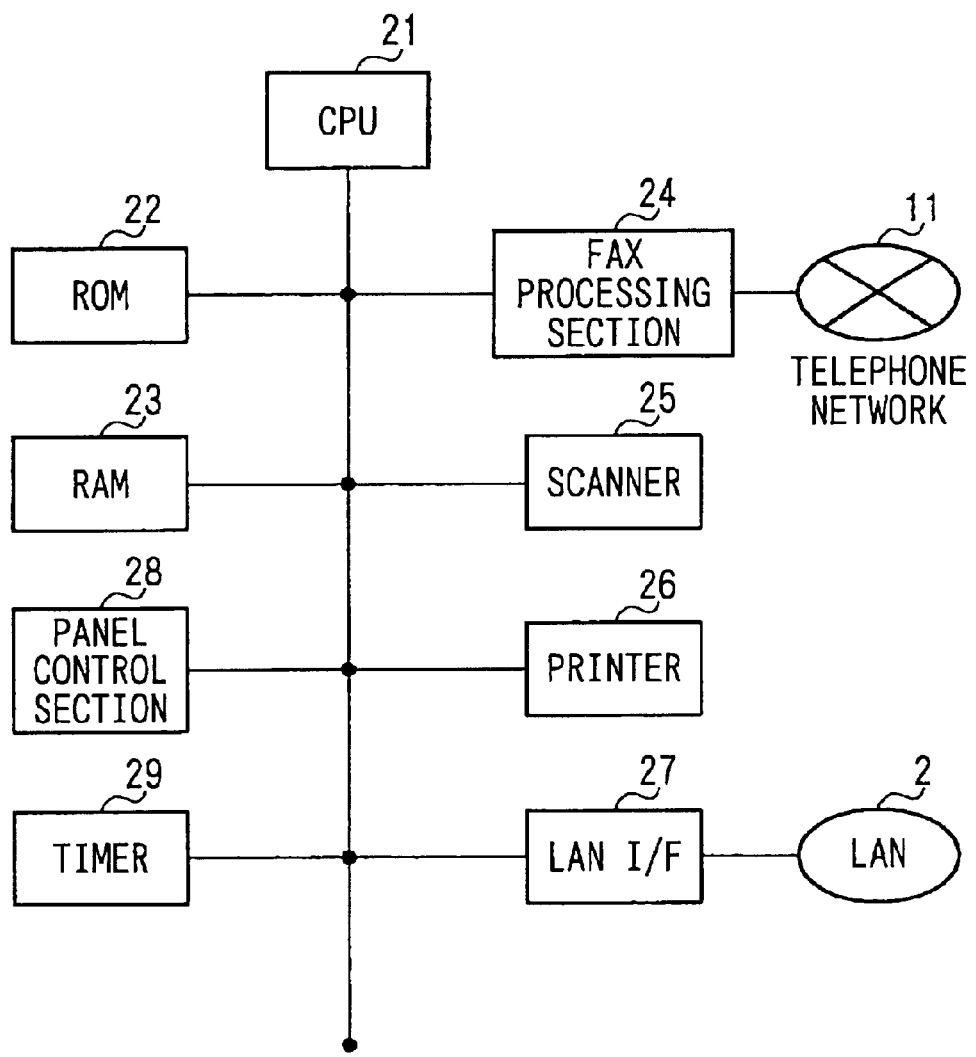
FIG. 2 is a block diagram showing hardware of the Internet facsimile apparatus according to the above embodiment.

FIG. 2 is a block diagram showing hardware of the Internet facsimile apparatus according to the above embodiment. A CPU 21 executes a program, and performs control of the entire apparatus. A ROM 22 stores the program executed by the CPU 21.

A RAM 23 has a work area, which executes the program, and a buffer area, which temporarily stores various kinds of data such as e-mail, image file, and the like.

A FAX processing section 24 is a device, which executes a G3 or G4 facsimile procedure for a FAX modem and an ISDN interface.

A scanner 25 scans an original to obtain image information. A printer 26 prints various kinds of data including received image information.

An LAN interface 27 executes a procedure, which is necessary for transmitting/receiving data on the LAN 2.

A panel control section 28 comprises a dial key and a touch panel, and receives operations to be performed by an operator such as designation of communication partner, a transmission start instruction, and so on.

A timer 29 performs a time measurement.

Figure 3:
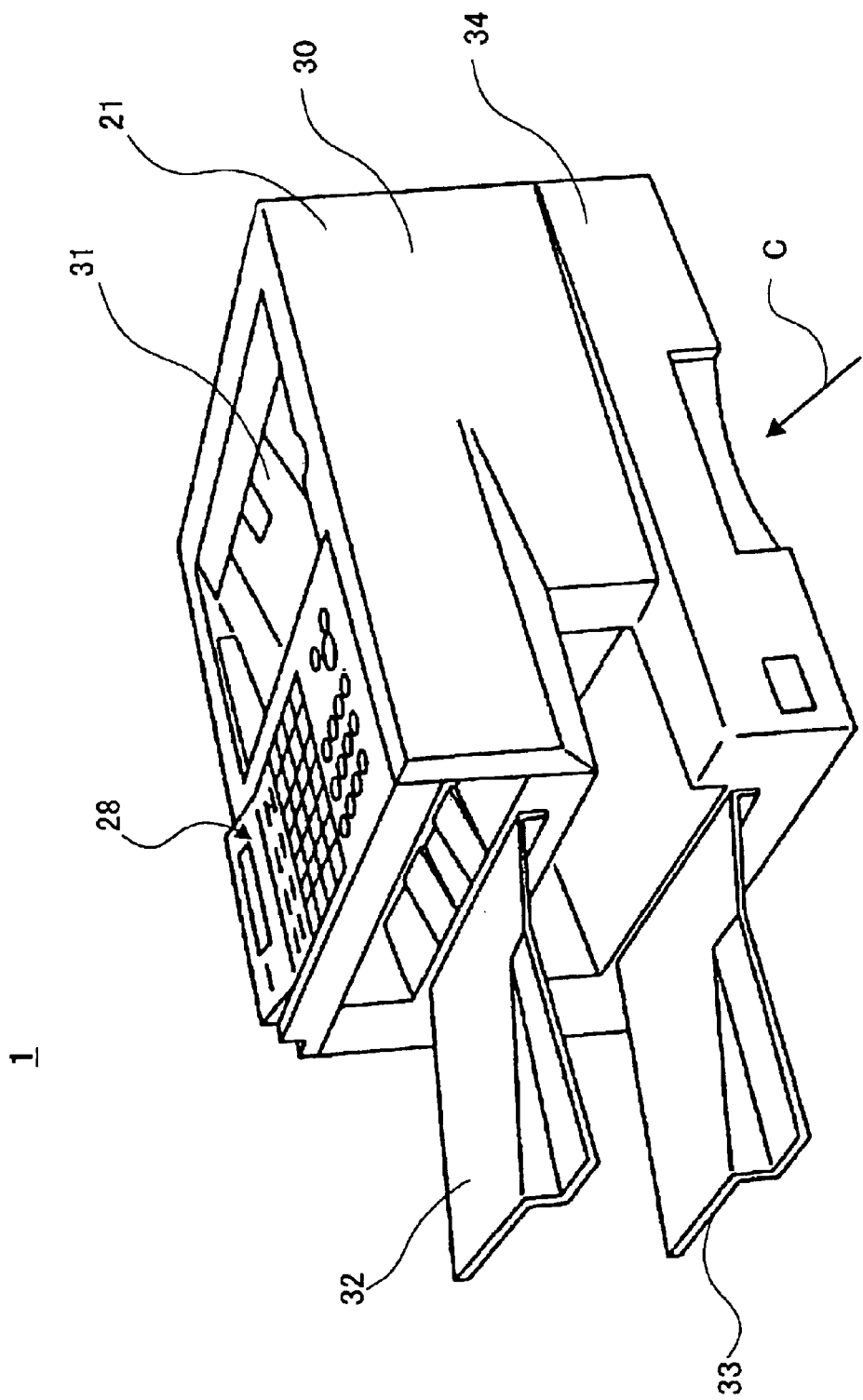
FIG. 3 is a perspective view showing an outline of the Internet facsimile apparatus according to the above embodiment.

FIG. 3 is a perspective view showing an outline of the Internet facsimile apparatus according to the above embodiment. The following will explain a case in which the IFAX 1 is seen from a direction indicated by an arrow C of FIG. 3. In the IFAX 1, the scanner 25, and the printer 26 are integrated into a housing 30 together with other configuration elements, namely, CPU 21, ROM 22, RAM 23, FAX processing section 24, LAN interface 27, and panel control section 28 as shown by FIG. 2. The panel control section 28 is provided at the upper surface portion of IFAX 1 and which is the left surface portion thereof. An original supporting state 31, which feeds an original to the scanner 25, is provided at the right side of the panel control section 28. At the left surface portion of the IFAX 1, output trays 32 and 33 for receiving printed materials outputted from the printer 26 are arranged in a vertical direction. A paper feeding section 34 for feeding paper to be printed to the printer 26 is provided at the bottom surface portion of IFAX 1.

The ROM 22 shown in FIG. 2 stores the program, and the CPU 21 executes the program. The functions to be resultantly implemented will be explained as follows.

Figure 4:
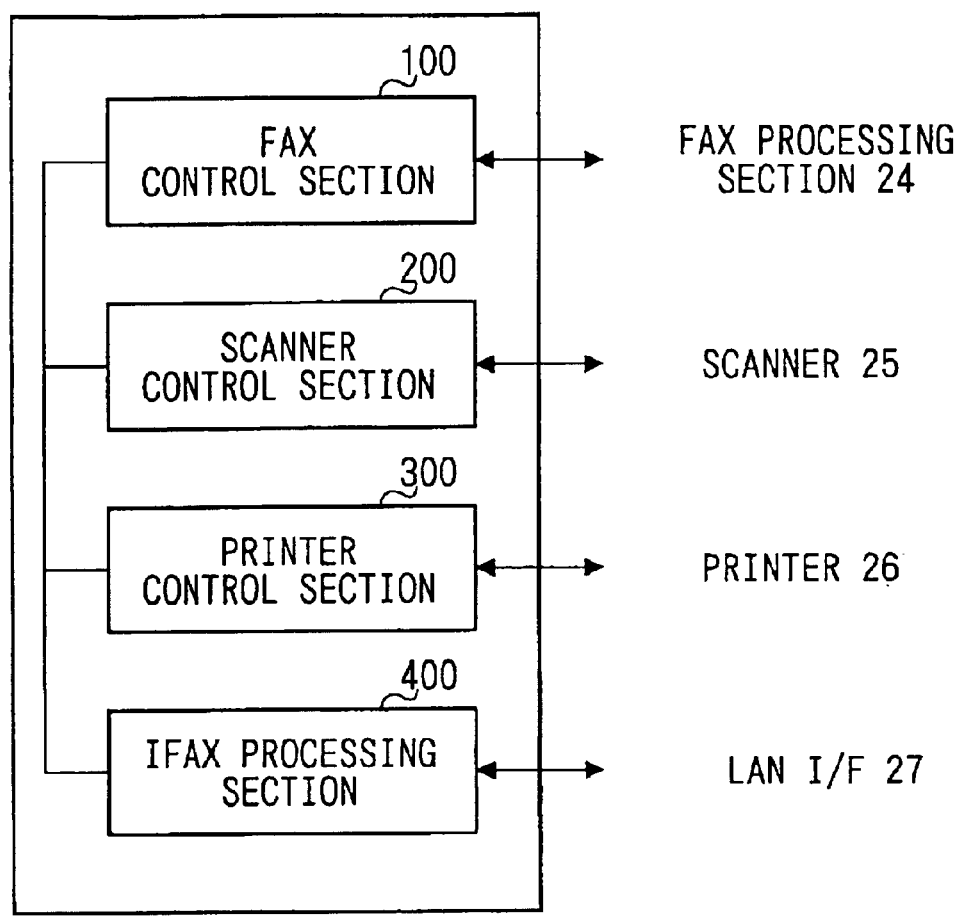
FIG. 4 is a block diagram showing functions of the Internet facsimile apparatus according to the above embodiment.

FIG. 4 is a block diagram showing functions of the Internet facsimile terminal apparatus according to the above embodiment.

The IFAX 1 comprises a FAX control section 100, a scanner control section 200, and a printer control section 300, which controls the respective processing sections of the FAX processing section 24, scanner 25, and printer 26.

Figure 5:
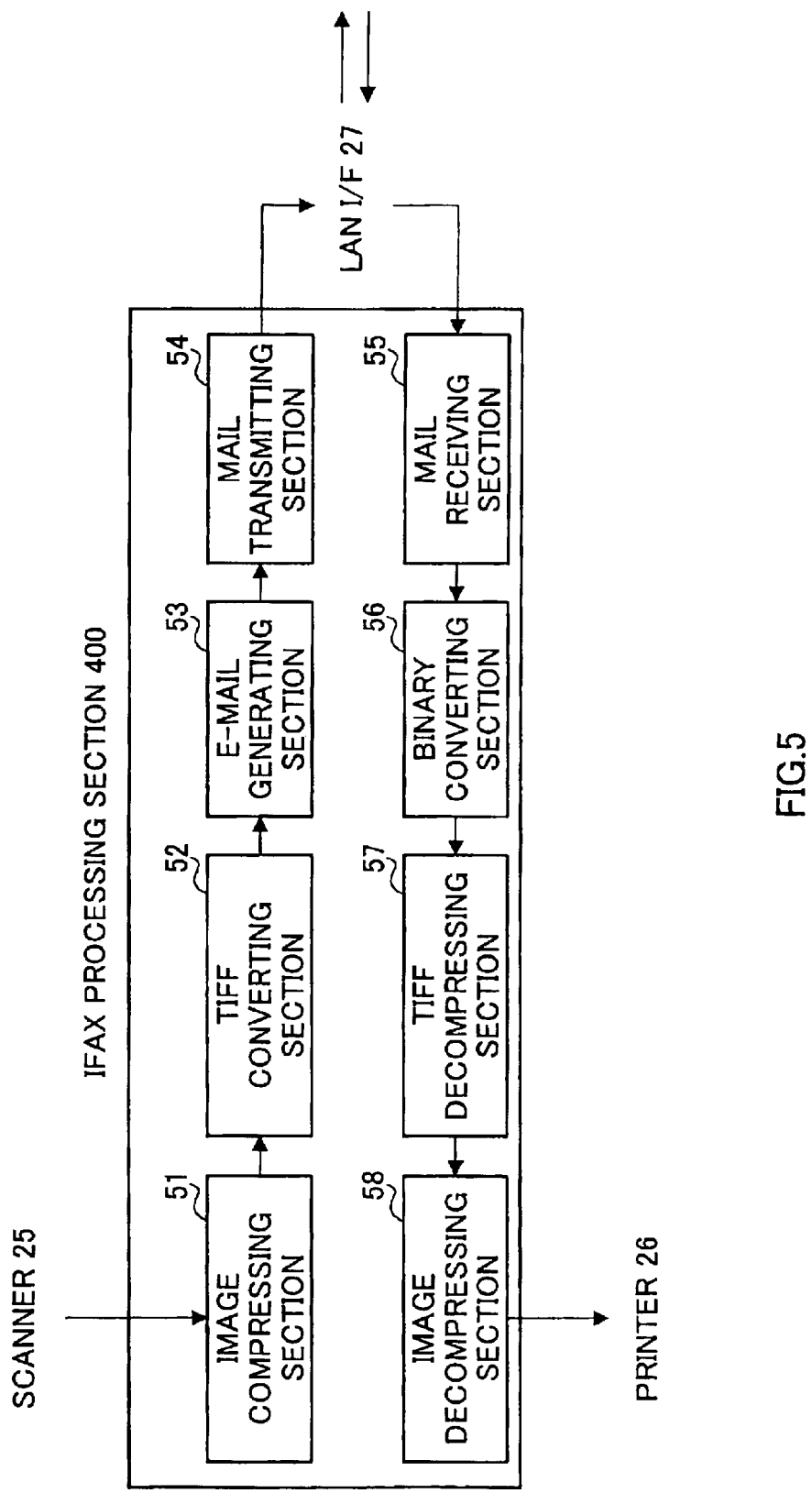
FIG. 5 is a block diagram showing basic functions of an IFAX processing section of the Internet facsimile apparatus according to the above embodiment.

The IFAX 1 also comprises an IFAX processing section 400 that implements the function as IFAX. FIG. 5 is a block diagram showing basic functions of an IFAX processing section of the Internet facsimile apparatus according to the above embodiment.

The IFAX processing section 400 comprises two units; an e-mail transmitting part and an e-mail receiving part.

First, in the e-mail transmitting part, an image compressing section 51 compresses raw image information (for example, bitmap data), which has been scanned by the scanner 25, in a compression format, for example, MH, so as to obtain a compressed file. The compression is performed in unit of one page of the original. A TIFF converting section 52 converts these compressed files to one TIFF (Tagged Image File Format) file. An e-mail generating section 53 attaches this TIFF file to a multipart mail in accordance with, for example, MIME (Multipurpose Internet Mail Extension). By processing so far, image information is converted to e-mail format. A mail transmitting section 54 transmits this e-mail via the LAN interface 27 using a mail transfer protocol such as SMTP and the like.

On the other hand, in the e-mail receiving part, a mail receiving section 55 receives e-mail via the LAN interface 27. This e-mail is a multipart mail, and the TIFF file is converted to character data, that is, text code, and appended to an attachment file part. A binary converting section 56 binary converts the text code of the image data part (attachment file part) of the multipart mail so as to obtain the TIFF file. The binary conversion is that text-code data is converted to binary data. Namely, data, which is text-coded using base 64, is decoded to be back to the original image data.

A TIFF decompressing section 57 opens this TIFF file to send the compressed file included in the TIFF file to an image decompressing section 58. An image decompressing section 58 decompresses the compressed file to obtain row image information. By processing so far, e-mail is converted to an image information format. The image information thus obtained is inputted to the printer 26 via the printer control section 300 and is printed.

Figure 6:
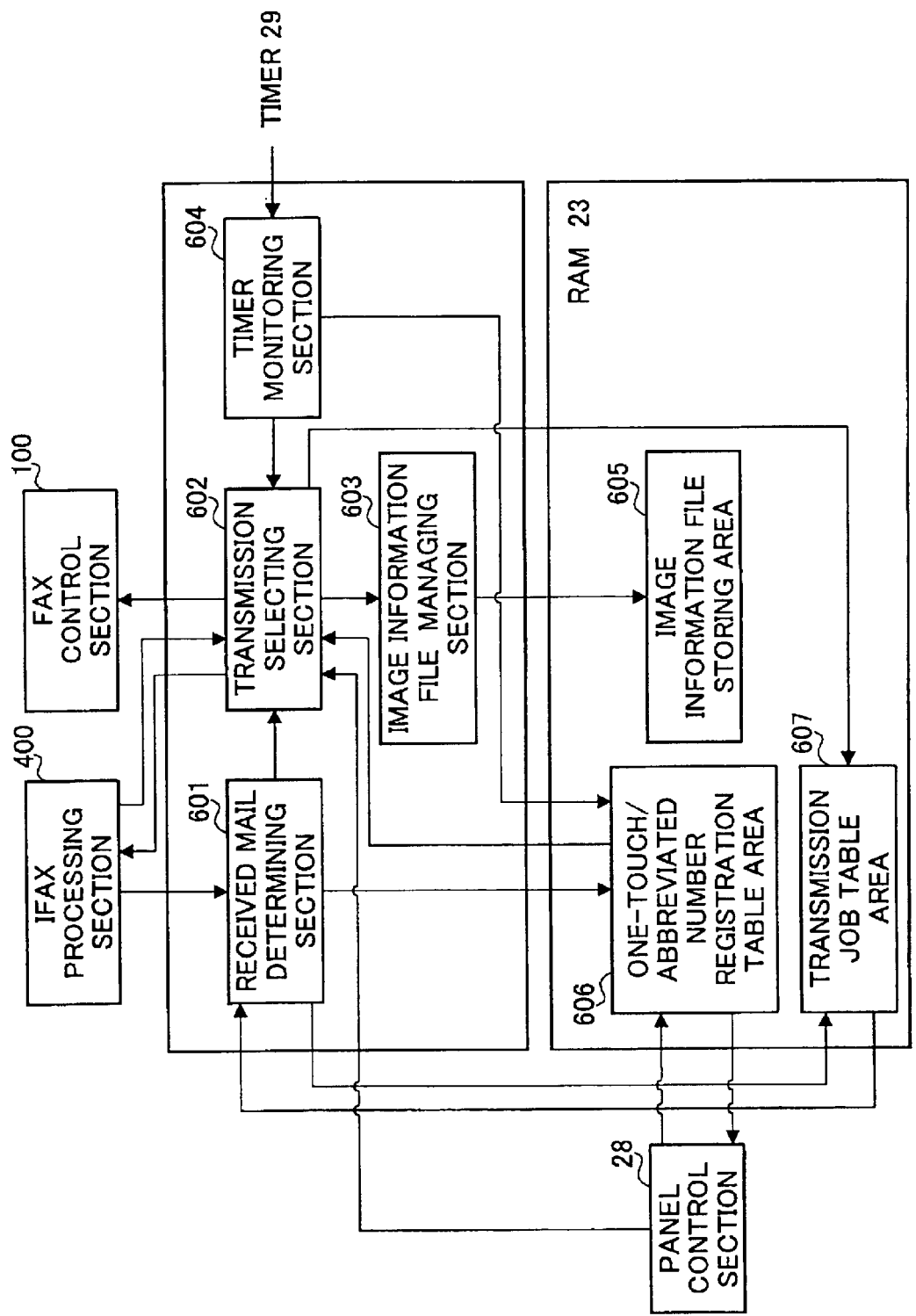
FIG. 6 is a function block diagram showing an image information transmission control section in the Internet facsimile apparatus according to the above embodiment.

Next, an explanation is given of an image information transmitting procedure in the IFAX 1 according to the above embodiment. FIG. 6 is a function block diagram showing an image information transmission control section in the Internet facsimile apparatus according to the above embodiment.

The image information transmission control section comprises a received mail determining section 601, a transmission selecting section 602, an image information file managing section 603, and a timer monitoring section 604. The receive mail determining section 601 analyzes e-mail received at the IFAX processing section 400 (hereinafter referred to as received mail), to determine whether or not is received e-mail is the error mail from the mail server. Moreover, the received mail determining section 601 determines whether or not the received e-mail is the DSN mail, and then determines whether or not the DSN mail notifies that the delivery of the e-mail normally ends. In addition, the received mail determining section 601 determines the correlation between the received e-mail and the image information file.

The IFAX 1 is capable to perform two image information transmitting procedures; one is IFAX transmission procedure and the other is FAX transmission procedure. The IFAX transmission procedure is that the image information is transmitted by the IFAX processing section 400 in accordance with the e-mail transfer protocol. The FAX transmission procedure is that the image information is transmitted by the IFAX control section 100 in accordance with the facsimile communication protocol. The transmission procedure selecting section 602 performs selection between the above two procedures.

The image information file managing section 603 reads the image information file stored in an image information file storing area 605 or deletes it. The read and delete of the image information file are performed in accordance with an instruction from the transmission selecting section 602.

The timer monitoring section 604 monitors the timer 29, and determines whether or not a count value of the timer, which is set at a transmission job starting time, reaches a timer value of a transmission job, which is set in the transmission job table.

In the RAM 23, the image information file storing area 605, a one-touch/abbreviated number registration table area 606, and a transmission job table area 607 are provided.

In the image information file storing area 605, image information transmitted by the IFAX processing section 400 is stored in, for example, compressed file format. A file name is provided to each of image information.

In the one-touch/abbreviated number registration table area 606, a one-touch/abbreviated number registration table is stored. FIG. 7 is a view showing one example of the one-touch/abbreviated number registration table of the Internet facsimile apparatus according to the above embodiment. In the one-touch/abbreviated number registration table, a registration number 701 of one-touch/abbreviated number, a destination mail address 702, a telephone (FAX) number 703, a FAX transmission flag 704, a timer initial value 705, and a delivery confirmation flag 706 are registered to be associated with one another as shown in FIG. 7.

The mail address 702 is read when the one-touch key is pressed from the panel control section 28 or the abbreviated number is inputted, and the read mail address 702 is sent to the IFAX processing section 400.

The telephone number 703 is read when the FAX transmission procedure is performed, and the read telephone number 703 is sent to the FAX control section 100. When no FAX transmission procedure is performed, the telephone number 703 is not registered.

The FAX transmission flag 704 is identification information indicating whether or not the FAX transmission procedure is performed in place of the IFAX transmission procedure.

The timer initial value 705 is a maximum time to wait for an error mail or a delivery confirmation mail after the IFAX transmission procedure, and the timer monitoring section 604 refers to the timer initial value 705.

The delivery confirmation flag 706 indicates whether or not there is a delivery status notification function in the receiver terminal apparatus.

In the transmission job table area 607, the transmission job table is stored. FIG. 8 is a view showing one example of the transmission job table of the Internet facsimile apparatus according to the above embodiment. In the transmission job table, a manage number 801, a destination mail address 802, a telephone (FAX) number 803, a timer value 804, a transmission mail message ID 805, status information 806, and a file name 807 are registered to be associated with one another.

The manage number 801 is a number for managing a transmission job. The destination mail address 802 is a destination mail address of transmission mail. The telephone number 803 is a destination telephone number used when the FAX transmission procedure is performed in place of the IFAX transmission procedure.

The timer value 804 is a value of the timer 29 showing a passage of time to wait for receiving an error mail or a delivery confirmation mail, and this value is decremented one by one every one minute by the timer monitoring section 604, and time is up when the value reaches zero.

The transmission mail message ID 805 is an identification number, which is provided to e-mail when the IFAX processing 400 generates e-mail.

The status information 806 shows a current status of this transmission job.

The file name 807 shows a file name of an image information file corresponding to this transmission job.

Figure 9:
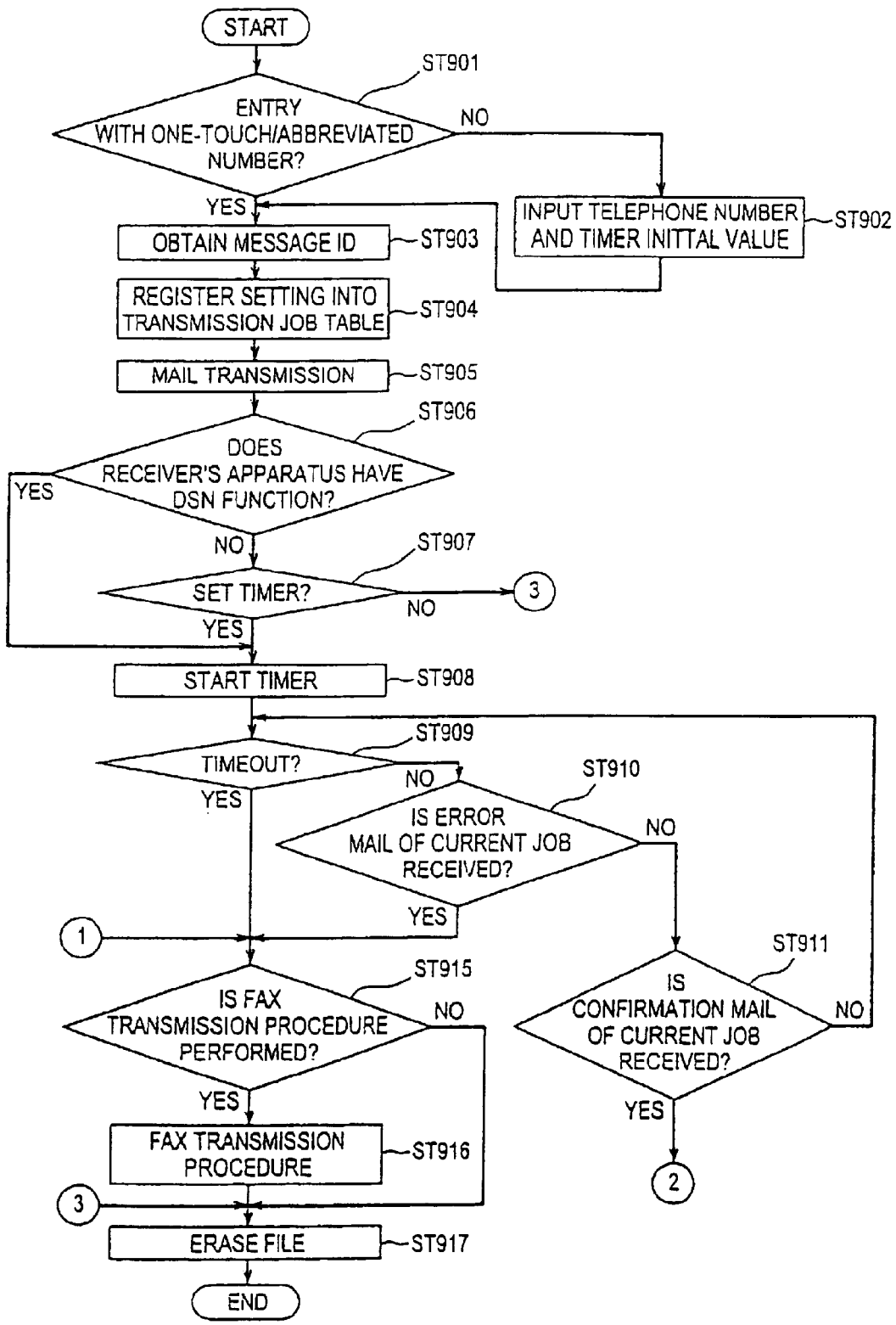
FIG. 9 is a flowchart showing an image information transmitting operation in the Internet facsimile apparatus according to the above embodiment.
Figure 10:
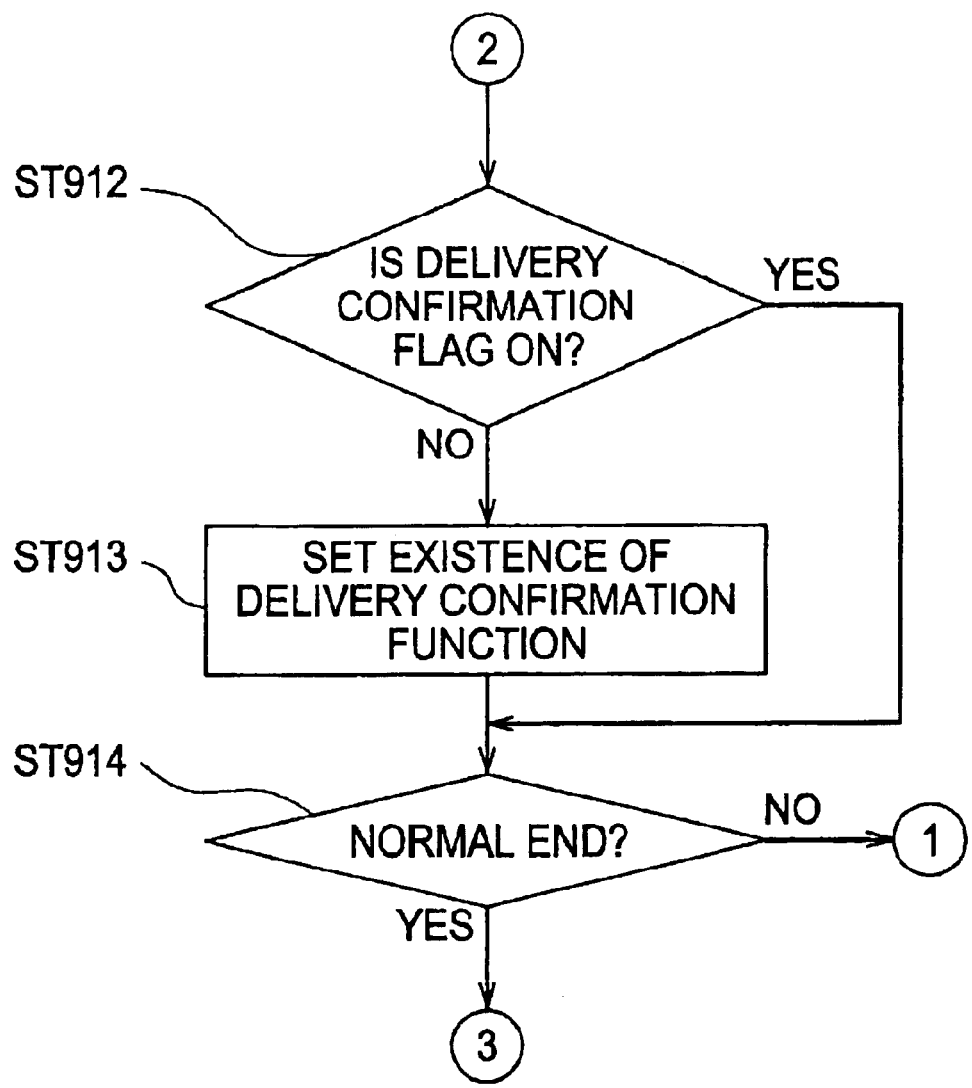
FIG. 10 is a flowchart showing an image information transmitting operation in the Internet facsimile apparatus according to the above embodiment.

An explanation is next given of an image information transmitting operation in the Internet facsimile apparatus according to the above embodiment. FIGS. 9 and 10 are flowcharts each showing an image information transmitting operation in the Internet facsimile apparatus according to the above embodiment.

When an operator performs an address entry, the panel control section 28 determines whether or not the entry is made with a one-touch operation or an abbreviated number (step (hereinafter referred to as ST) 901).

When the address entry is not made with the one-touch operation or the abbreviated number, that is, the operator inputs the destination mail address manually, the panel control section 28 requests the input of the telephone number and that of the timer initial value for the operator (ST902). The telephone number and the timer initial value are sent to the transmission selecting section 602. Accordingly, when the IFAX transmission procedure ends unsuccessfully, they are used in the FAX transmission procedure.

In ST901, when the address entry is made with the one-touch operation or the abbreviated number, i.e., an automatic address entry, the operation goes to ST903.

In ST903, the transmission selecting section 602 obtains a transmission mail message ID from the IFAX processing section 400. Thereafter, the transmission selecting section 602 registers the destination mail address 802, telephone number 803, timer initial value, transmission mail message ID 805, and file name 807 into the transmission job table as shown by FIG. 8, respectively (ST904). In this step, the timer initial value is registered into the transmission job table as the timer value 804.

At this time, when the address entry is made with the automatic address entry in ST901, the transmission selecting section 602 reads the destination mail address 702, telephone number 703, and timer initial value 705, respectively from the one-touch/abbreviated number registration table. At this time, the transmission selecting section 602 registers them into the transmission job table. While, when the address entry is not made with the one-touch operation or the abbreviated number in ST901, the destination mail address, telephone number and timer initial value, which are inputted from the panel control section 28, are registered into the transmission job table.

Thereafter, the transmission mail is transferred to the SMTP server 4 in accordance with the e-mail transfer protocol at the IFAX processing section 400 (ST905).

When the IFAX transmission is performed, the transmission selecting section 602 determines whether or not the IFAXes 8, 9 or PC 10, which are provided on the receiver side (hereinafter referred to as receiver's apparatus) has a DSN function with reference to the delivery confirmation flag 706 of the one-touch/abbreviated number registration table (ST906). When the receiver's apparatus has no DSN function, the transmission selecting section 602 determines whether or not the timer 29 is set to the timer initial value 705 (ST907). This determination is carried out based on whether or not the timer initial value 705 of the one-touch/abbreviated number registration table is entered. Thus, if the initial time 705 is entered in the one-touch/abbreviated number registration table, the timer is set. On the contrary, if it isn't entered, the timer 29 isn't set.

When the receiver's apparatus has a DSN function in ST906 and it is determined that the timer 29 is set in ST907, the timer monitoring section 604 starts the count of the timer 29. The timer monitoring section 604 decrements the timer value 804 of the transmission job table by one every one minute when starting the count of the timer 29.

After starting the count of the timer 29, the received mail determining section 601 determines whether or not a timeout occurs, namely, the timer value 804 of the transmission job table reaches zero (ST909). When no timeout occurs, the received mail determining section 601 determines whether or not the error mail of the transmission job in current processing (hereinafter referred to as current job) is received (ST910). Here, the determination in which the received e-mail is the error mail of the current job is carried out when the transmission mail message ID 805 of the current job registered in the transmission job table matches a mail message ID included in the error mail. The error mail is one which is obtained when the SMTP server 4 adds a predetermined fixed message, which is indicative of failure in the transfer of transmission mail, to the message of the transmission mail. As shown in FIG. 11, a message ID 1103 is included in a transmission mail message portion 1102 of an error mail 1101. The received mail determining section 601 detects and extracts the message ID 1103 from the error mail 1101, and compares the extracted message ID 1103 with the transmission mail message ID 805 of the current job.

When the error mail of the current job is not received in ST910, the received mail determining section 601 determines whether or not the DSN mail of the current job is received (ST911). Whether or not the DSN mail of the current job is received is determined based on whether or not format of the received mail agrees with the format of DSN proposed in RFC 1894. It is possible to extract the message ID 1103 from this DSN format.

When the IFAX processing section 400 receives the received mail and the received mail is a DSN mail, the received mail determining section 601 determines whether or not a delivery confirmation flag 706 is ON with reference to the one-touch/abbreviated number registration table (ST912). When the delivery confirmation flag 706 is OFF, the received mail determining section 601 turns on the delivery confirmation flag 706 of the current job of the one-touch/abbreviated number registration table (ST913). While, when the delivery confirmation flag 706 is ON, ST913 is skipped and the delivery confirmation flag 706 is maintained as it is.

Thereafter, the received mail determining section 601 determines whether the content of the DSN mail notices that the delivery of the current job normally ends or abnormally ends (ST914).

When neither the error mail of the current job nor the DSN is received by the IFAX processing section 400 in ST910 and ST911, the operation goes back to ST909.

When the timeout occurs in ST909 and the error mail is received in ST910 and the notification content of the DSN is the abnormal end in ST914, the transmission selecting section 602 determines whether or not the FAX transmission procedure is carried out with reference to the transmission job table (ST915). When the FAX transmission flag 704 of the transmission job table is ON, the transmission selecting section 602 determines that the FAX transmission procedure is carried out. Conversely, when the FAX transmission flag 704 of the transmission job table is OFF, the transmission selecting section 602 determines that no FAX transmission procedure is carried out.

In the case of performing the FAX transmission procedure, the transmission selecting section 602 instructs the FAX control section 100 to transmit the image information file of the current job to the telephone number 803 (ST916).

After ending the FAX transmission procedure in ST916 or when the timer 29 is not set in ST907 and no FAX transmission procedure is carried out in ST915, the transmission selecting section 602 instructs the image information managing section 603 to erase the image information file corresponding to the file name 807 of the current job (ST917). The image information managing section 603 erases the corresponding information file from the image information file storage area 605 in accordance with this instruction.

Next, the image information transmission, which the IFAX 1 performs in accordance with the above-mentioned flow, will be explained on a case-by-case basis. FIGS. 12 to 14 are sequence views each showing an image information transmission performed by the Internet facsimile apparatus according to the above embodiment.

First, an explanation is given of a case in which there is a DSN function in the receiver's apparatus. In the case where the IFAX 1 does not receive the DSN from the receiver's apparatus even when the timeout occurs as shown in FIG. 12A, image information transmission is performed by FAX transmission procedure for IFAX transmission procedure. As a result, when the receiver's apparatus does not receive the transmission mail within a time value, image information is transmitted to the receiver by the FAX transmission procedure, making it possible to suppress delay in image information transmission to about the time value.

In the case where image information transmission is not performed by FAX transmission procedure for IFAX transmission procedure, the IFAX 1 erases the image information file and reclaims the memory when receiving no DSN from the receiver's apparatus even when a timeout occurs as shown in FIG. 12B. This makes it possible to prevent the image information file storage area 605 from being occupied by the image information file everlastingly, and to improve the effective use of the memory.

When the IFAX 1 receives the DSN before the timeout occurs, the IFAX 1 erases the image information file and reclaims the memory as shown in FIG. 13A. This makes it possible to prevent the image information file storage area 605 from being occupied by the image information file everlastingly, and to improve the effective use of the memory.

On the other hand, as shown in FIG. 13B, when the DSN mail indicates the abnormality, the image information transmission is carried out by the FAX transmission procedure for the IFAX transmission procedure. As a result, when the receiver's apparatus cannot normally receive the transmission mail, the IFAX 1 immediately transmits image information to the receiver by the FAX transmission procedure. For this reason, even when abnormality occurs in the transmission of image information using e-mail because of a reason, for example, the receiver's apparatus cannot deal with image information or e-mail, image information can be transmitted to the receiver immediately and without fail.

In FIGS. 13A and 13B, when the IFAX 1 receives the DSN mail, the IFAX 1 registers the fact, in which the receiver's apparatus has the DSN function, into the one-touch/abbreviated number registration table. This makes it possible for the IFAX 1 to automatically change the setting such that the IFAX 1 waits for the DSN to be sent from the receiver's apparatus after transmitting image information using e-mail from the next time.

Figure 14B:
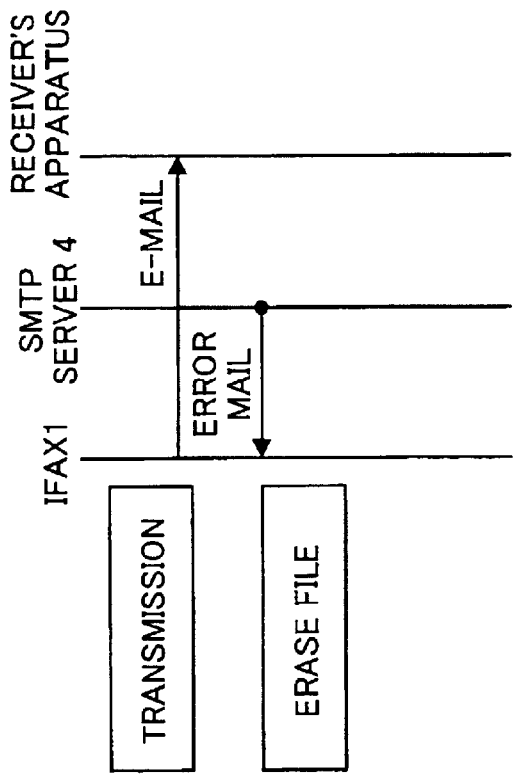
FIG. 14B is a sequence view showing an image information transmission performed by the Internet facsimile apparatus according to the above embodiment.
Figure 14A:
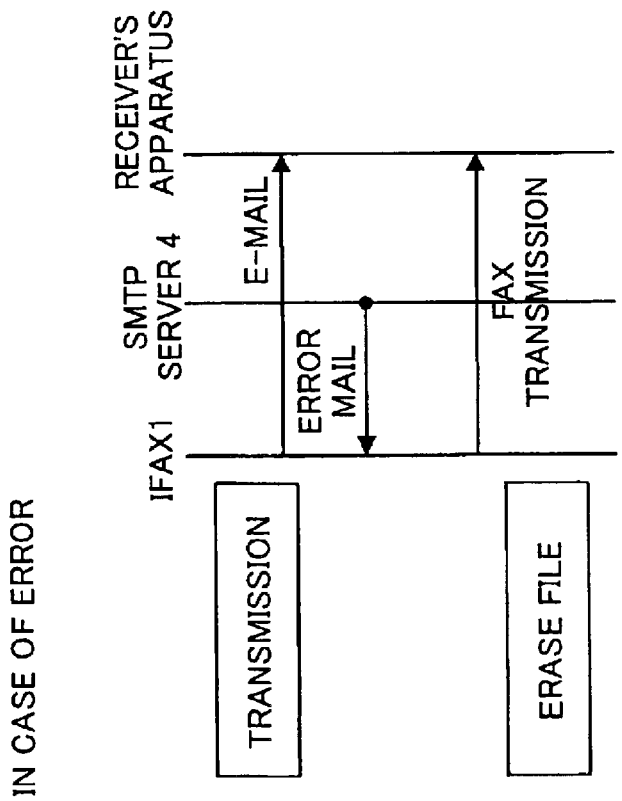
FIG. 14A is a sequence view showing an image information transmission performed by the Internet facsimile apparatus according to the above embodiment.

In the case of receiving the error mail from the SMTP server 4, the IFAX 1 transmits image information to the receiver immediately as shown in FIG. 14A. As a result, even when abnormality occurs in the transmission of image information using e-mail because of a reason on the transmission side, for example, the destination mail address is incorrect, and the other reason, for example, the POP3 server 7 is down, image information can be transmitted to the receiver immediately without fail.

When image information transmission is not carried out by the FAX transmission procedure for the IFAX transmission procedure, the IFAX 1 immediately erases the image information file to reclaim the memory when receiving the error mail as shown in FIG. 14B. This makes it possible to prevent the image information file storage area 605 from being occupied by the image information file everlastingly, and to improve the effective use of the memory.

As mentioned above, according to the IFAX 1 of relating to this embodiment, it is assumed that the IFAX processing section 400 transmits image information to the receiver's apparatus in accordance with the e-mail transfer protocol over the computer network work having LAN 2, Internet 5 and LAN 6 but the receiver's apparatus does not normally receive image information within the time value. In this case, the IFAX 1 instructs the FAX control section 100 to transmit image information to the receiver's apparatus in accordance with the facsimile communication protocol via the telephone network 11. This makes it possible to transmit image information within the time value without fail. As a result, the IFAX 1 can insure the real-time property in the transmission of image information using e-mail whose communication cost is low.

Here, the case, in which the receiver's apparatus does not normally receive image information within the time value, can be applied to, for example, the following cases (1) and (2):

(1) The receiver's apparatus has the function of transmitting the DSN mail or the likes and does not receive the DSN within the time value, and the receiver's apparatus receives the DSN showing the abnormal reception, and (2) The receiver's apparatus receives the error mail from the mail server on the computer network such as the SMTP server 4 and the like within the time value.

Moreover, according to the above embodiment, the IFAX 1 transmits image information when performing the retransmission of image information. If the receiver's apparatuses are IFAXes 8 and 9, image information can be received by both e-mail and facsimile, with the result that no problem occurs. However, when the PC 10 has no FAX modem, it is impossible to facsimile-transmit image information to the PC 10 directly. In this case, the nearest IFAX or G3/G4 FAX is used as a destination of FAX transmission procedure. In this way, the present invention includes the case in which image information is retransmitted, by use of FAX, to the same person as the sender of image information using IFAX.

Furthermore, since the IFAX 1 according to this embodiment retransmits image information using FAX, image information transmitted by IFAX is stored to the image information file storage area 605 of the RAM 23. In many cases, the RAM 23 serves as both an image memory for storing image information received by the FAX control section 100 and IFAX processing section 400 and a working memory used when the CPU 21 executes a program. It is inconvenient for the image information file for retransmission to occupy the RAM 23 everlastingly. In order to solve such inconvenience, the IFAX 1 according to this embodiment erases the image information file of RAM 23 and reclaims the memory area when the transmission of image information at the IFAX processing section 400 is normally completed or the retransmission using FAX is completed. As a result, the effective use of the memory area of RAM 23 is improved, thereby making it possible to prevent occurrence of inconvenience wherein the image information file to be newly transmitted cannot be stored and received image information cannot be stored to the memory.

Furthermore, according to the IFAX 1 relating to this embodiment, when the IFAX processing section 400 receives the DSN from the receiver as shown in FIG. 13A and FIG. 13B, the IFAX 1 sets the delivery confirmation flag 706, which corresponds to the receiver, to ON automatically. Whereby, for example, the delivery confirmation flag 706 is set to OFF at an initial setting, and image information is actually transmitted to the receiver's apparatus. Thereafter, the delivery confirmation flag 706 is automatically updated in accordance with the transmission result. This eliminates the operators having to change the delivery confirmation flag 706, with the result that the IFAX, which is friendly to users, can be provided.

Another standpoint of the present invention lies in the combined use of non-real time communication and real communication. Namely, e-mail communication, which is implemented between the computer network and the mail server, is non-real communication, while facsimile communication, which is performed on the telephone network, is real time communication. According to the present invention, their merits and demerits are compensated for each other by combining these communications. The real time communication includes real-time Internet facsimile communication, which is defined under ITU T.38, and real-time communication, which is performed on the computer network such as Fax over IP, in place of the G3/G4 facsimile.

The present invention is not limited to the above embodiment. The above embodiment explained the terminal apparatus, which was the same as the normal facsimile apparatus as shown in FIG. 3. However, the present invention can be applied to server apparatuses such as a FAX server, an IFAX server, a mail server, and a gateway apparatus between a telephone network and Internet/LAN. In this case, they do not always comprise a scanner and a printer.

This invention may be conveniently implemented using a conventional general purpose digital computer or microprocessor programmed according to the teachings of the present specification, as will be apparent to those skilled in the computer art. Appropriate software coding can readily be prepared by skilled in programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

As explained above, according to the present invention, when image information is transmitted using e-mail but the receiver does not normally receive the corresponding image information within a predetermined time period, image information is retransmitted to the receiver. This brings about an effect in which a real-time property can be insured as making use of advantages of e-mail.

The present invention is not limited to the above described embodiments, and various variations and modifications may be possible without departing from the scope of the present invention.

This application is based on the Japanese Patent Application No. 2000-188367 filed on Jun. 22, 2000, entire content of which is expressly incorporated by reference herein.

What is claimed is:

1. An Internet facsimile apparatus comprising:
    a mail transmitter that transmits image information on a computer network to a destination in accordance with an e-mail transfer protocol;
    a mail receiver that receives an e-mail message on said computer network in accordance with the e-mail transfer protocol; and
    a facsimile transmitter configured to transmit image information in accordance with a facsimile communication protocol, wherein, when said mail transmitter transmits said image information to the destination and then said mail receiver receives an error mail, said facsimile transmitter transmits said image information to the same destination,
    wherein a message ID is extracted from the error mail and image information corresponding to said message ID is transmitted by facsimile transmitter to the same destination.

2. An Internet facsimile communication method comprising:
    transmitting image information on a computer network to a destination in accordance with an e-mail transfer protocol;
    transmitting said image information to the same destination in accordance with a facsimile communication protocol when said image information is transmitted to the destination in accordance with the e-mail transfer protocol and then an error mail is received,
    wherein the transmitting of said image information to the same destination comprises extracting a message ID from the error mail and transmitting image information corresponding to said message ID in accordance with the facsimile communication protocol to the same destination.

3. An Internet facsimile apparatus comprising:
a LAN interface configured to transmit an e-mail to which image data is attached, via a LAN;
a facsimile communicator configured to transmit image data via a telephone network; and
a controller configured, when the LAN interface transmits the e-mail to a predetermined recipient and receives an error mail, the error mail being related to the transmitted e-mail, to check a message ID in the error mail, and to transmit the image data to the predetermined recipient via the facsimile communicator the image data corresponding to the message ID.

4. An Internet facsimile communication method comprising:
transmitting, to a predetermined recipient, an e-mail to which image data is attached, via a LAN;
receiving an error mail, the error mail being related to the transmitted e-mail;
checking a message ID in the error mail; and
transmitting the image data to the predetermined recipient via a telephone network, the image data corresponding to the message ID.

* * * * *